UNITED STATES PATENT OFFICE.

HARLAN L. TRUMBULL, OF CHICAGO, ILLINOIS, AND WILLIAM L. EVANS, OF COLUMBUS, OHIO, ASSIGNORS TO NEWTON D. BAKER, SECRETARY OF WAR, TRUSTEE.

PROCESS FOR MAKING CRYSTAL VIOLET.

1,402,195.  Specification of Letters Patent.  Patented Jan. 3, 1922.

No Drawing.  Application filed September 16, 1919. Serial No. 324,242.

(FILED UNDER THE ACT OF MARCH 3, 1883, 22 STAT. L., 625.)

*To all whom it may concern:*

Be it known that we, HARLAN L. TRUMBULL and WILLIAM L. EVANS, citizens of the United States, residing in Chicago, Ill., and Columbus, Ohio, respectively, have invented an Improvement in Processes for Making Crystal Violet, of which the following is a specification.

The invention described herein may be used by the Government, or any of its officers or employees in prosecution of work for the Government, or by any other person in the United States, without payment of any royalty thereon.

Our invention relates to the production of crystal violet from chlorpicrin and dimethyl aniline with aluminum chloride as a catalyst.

The process consists in mixing 1645 parts by weight of dry chlorpicrin with 3630 parts by weight of dry dimethyl aniline. At the temperature of boiling water a small amount of anhydrous aluminum chloride is added to the mixture, whereupon a violet interaction ensues with the production of brown and violet fumes. The residue which remains after the reaction has ceased is crystal violet.

In carrying out this process the best results are obtained when the chlorpicrin and dimethyl aniline are dry; however, satisfactory results may be obtained when these materials are used in an undried state.

The present invention is not limited to the specific details set forth in the foregoing example which should be construed as illustrative and not by way of limitation, and in view of the numerous modifications which may be effected therein without departing from the spirit and scope of this invention, it is desired that only such limitations be imposed as are indicated in the appended claims.

What we claim is:

1. A process of making crystal violet comprising adding chlorpicrin to dimethyl aniline and heating the resulting mass to reaction temperature.

2. A process of making crystal violet comprising adding dry chlorpicrin to dry dimethyl aniline and heating the resulting mass to reaction temperature.

3. A process of making crystal violet comprising adding a catalyst to a mixture of chlorpicrin and dimethyl aniline and heating the resulting mass to reaction temperature.

4. A process of making crystal violet comprising adding a catalyst to a mixture of dry chlorpicrin and dry dimethyl aniline and heating the resulting mass to reaction temperature.

5. A process of making crystal violet comprising adding aluminum chloride to a mixture of chlorpicrin and dimethyl aniline and heating the resulting mass to reaction temperature.

6. A process of making crystal violet comprising adding anhydrous aluminum chloride to a mixture of dry chlorpicrin and dry dimethyl aniline and heating the resulting mass to reaction temperature.

HARLAN L. TRUMBULL.
WILLIAM L. EVANS.